United States Patent [19]

Schwartz

[11] Patent Number: 4,563,386

[45] Date of Patent: Jan. 7, 1986

[54] FRICTION ELEMENT COMPRISED OF HEAT RESISTANT HETEROGENEOUS THERMOSETTING FRICTION MATERIAL

[75] Inventor: Hugo D. Schwartz, Herslia Pituach, Israel

[73] Assignee: Cercasbest Corp., Tel Aviv, Israel

[21] Appl. No.: 652,071

[22] Filed: Sep. 19, 1984

[51] Int. Cl.$^4$ .................. C08G 51/08; F16D 69/02
[52] U.S. Cl. .................. 428/283; 188/251 A; 192/107 M; 428/338
[58] Field of Search .................. 428/147, 283, 338; 192/107 M; 188/251 A

[56] References Cited

U.S. PATENT DOCUMENTS

| | | | |
|---|---|---|---|
| 3,434,998 | 3/1969 | Aldrich et al. | 188/251 M |
| 3,585,102 | 6/1971 | Burgess | 428/147 |
| 4,280,935 | 7/1981 | Ogiwara | 188/251 A |
| 4,364,997 | 12/1982 | Yamamoto et al. | 188/251 A |

*Primary Examiner*—William J. Van Balen
*Attorney, Agent, or Firm*—Littlepage & Webner

[57] ABSTRACT

Novel heat resistant heterogeneous thermosetting compositions of matter are described wherein one functionally useful thermosetting reinforced plastic friction material comprises a homogeneous continuous phase and another dissimilar functionally useful thermosetting reinforced plastic friction material comprises a second homogeneous phase dispersed heterogeneously as granules in random manner throughout the first phase, whereby a functional advantage is obtained over a simple homogeneous mixture of the two materials, throughout the life of the friction element.

6 Claims, No Drawings

FRICTION ELEMENT COMPRISED OF HEAT RESISTANT HETEROGENEOUS THERMOSETTING FRICTION MATERIAL

FIELD OF THE INVENTION

The novel compositions of matter of the invention are useful as friction materials, for example, as brake and clutch linings, but are also useful for bearings and as gasketting materials.

BACKGROUND OF THE INVENTION

Prior art friction materials have not successfully combined two heterogeneous phases, each composed of a thermosetting reinforced plastic friction material, to form a friction element having more advantageous properties than either of its components throughout the life of the friction element. For example, U.S. Pat. No. 3,434,998 has an upper limitation of 25% for the discrete phase in order to achieve acceptable properties using a semi-metallic non-reinforced friction material for the discrete phase. U.S. Pat. No. 3,585,102 discloses a system wherein the granular phase is only of use during the initial seating-in period, and a functional advantage is not gained for the whole lifetime of the friction element.

OBJECTS OF THE INVENTION

The object of the invention is to provide a friction material composed of two separate phases, each phase comprising a thermosetting reinforced plastic friction material of dissimilar properties. It is another object of this invention to provide a friction element having a continuous phase and a discrete granular phase and having functionally more advantageous properties than those of either phase alone. It is a further object of the invention that a permanent, non-localized, non-cosmetic functional advantage accrues from the practice of the invention which could not be obtained in the same measure by simply blending both materials into one homogeneous phase.

DESCRIPTION OF THE INVENTION

The novel compositions of matter of this invention are useful mainly as friction materials in brake and clutch linings, but are also useful for bearing and gasketting materials. The compositions are suitable for both drum brake linings and disc brake linings.

Two separate phases are formed in the heterogeneous friction element of this invention, a homogeneous continuous phase, and dispersed within it granules of a separate discrete phase, each of the two phases being a thermosetting reinforced plastic friction material when used alone but each having dissimilar properties and functional limitations. It has been found by combining them using the method described herein that the advantageous properties of each of the two dissimilar friction materials are retained, the disadvantageous properties are minimized, and the friction element produced, as a whole, has unexpectedly advantageous properties over those which would be expected from consideration of the properties of the materials of the two phases independently, or from the properties of a friction material which would have been produced had the two phases been blended together to form a homogeneous material. The functional properties of the novel composite of this invention are superior to those of either phase. The discrete granular phase may consist of granules of more than one thermosetting reinforced plastic friction material in order to achieve specific desirable properties in the friction element.

The working surface of the heterogeneous friction element consists at all times of randomly placed sections of one or other of the individual friction materials, no section being preplaced in the surface of the friction element. The sections are large enough to be visually distinct from one another, giving a mottled appearance to the friction element. The discrete phase is embedded throughout the continuous phase and is not only found on the surface. The granules of the discrete phase are usually between $\frac{1}{8}$ and $\frac{1}{4}$ of an inch in size to allow random dispersion through all parts of the finished friction element. This is a distinction from one prior art practice of placing large portions of a second friction material at predetermined positions in a brake lining in order to eliminate a local source of trouble. The essence of the present invention is that the granules are randomly and uniformly distributed throughout all parts of the friction element. Functional properties of a friction material which can be upgraded by the practice of this invention include the hot and cold friction levels, the fade resistance, the abrasion resistance, the resistance to thermal degradation resulting from prolonged use at high temperatures, toughness, resistance to fracture, thermal conductivity, coefficient of expansion and thermal distortion.

Friction materials are compositions of matter useful for fabricating into brake and clutch linings or similar products for use on vehicles, industrial machinery, aircraft or other equipment where the friction force generated between a friction material and a rotating or sliding surface is used to stop, drive or steer the equipment. Many types of friction material are potentially useful but are limited by cost or difficulty in processing, which may be overcome by use of the compositions of the present invention.

Friction material compositions of the present invention comprise reinforcing fillers, thermosetting binders, and optionally but preferably, modifiers. Reinforcing fillers are usually fibrous material, but may be in the form of glass microspheres. The filler may be in the form of loose fibers or may be in textile form, for example, yarn, roving, cloth or paper. The thermosetting binder may be organic or inorganic and may include binders containing an agent which induces the change to an infusible form to occur at room temperature. Modifiers are often added to improve frictional properties, prolong life, improve processing, reduce cost or for other reasons.

The reinforcing filler usually comprises at least 10%, and more usually, above 20% by volume. The thermosetting binder usually comprises from about 20 to 40% by volume of the total, the remainder consisting of modifiers.

The most usual reinforcing filler is asbestos fiber, but in a non-asbestos containing phase the reinforcing filler may be steel fiber, glass fiber, carbon fiber, polyaramide fiber such as Kevlar, oxydized acrylonitrile fiber, potassium titanate fiber, various mineral and inorganic synthetic fibers, basalt, aluminum silicate, silica, aluminum oxide and other materials including heat resistant organic fibers. These fibers and others may be used as loose fibers or fabricated into textile fabric or mat.

The most usual thermosetting binder is a resin based on phenol or its homologs, particularly the cresols, alkylated phenols, cashew nut shell liquid or cardanol.

Such phenolic resins may be unmodified or modified in a large variety of known ways and may be either in solid or fluid form. Also widely used are various forms of synthetic elastomer such as polybutadiene, polychloroprene, silicone elastomer, fluorinated rubbers and many others. Other organic binders are also widely used such as melamine resins, epoxy resins, polyamide and other nitrogenous resins, silicone resins, fluoroethylene resins, and many other heat resistant binders. Friedel-Crafts resins are particularly suitable. For example, Xylok 210 and Xylok 225, marketed by Albright and Wilson of Oldbury, England. Inorganic binders may also be used, particularly ceramic binders. For aeronautical applications carbonized organic binders are used to form "carbon bonded carbon fibers".

A wide variety of modifiers may be used. These include small particles of cured resins or rubber, mineral powders, graphite flakes or coke particles, metal powders or particles, finely disintegrated brake lining waste and many other materials.

The compositions of the present invention may use either asbestos or non-asbestos materials as one or both phases. Where both phases contain asbestos, the cost is lower. Where one phase is non-asbestos containing, it is preferred that the asbestos containing phase is the continuous phase and that the amount of asbestos containing material be held to 25% of the total or less and the amount of asbestos itself be held to 10% of the total or less. If the asbestos containing phase is prepared by wet mixing the release of asbestos into the air is minimized. Where both phases are non-asbestos containing, the product is more expensive but is also more resistant to heat and abrasion. Turning now to a description of each phase, the continuous phase should be essentially in the uncured state and must be easily shaped to its final form by any conventional method, including heating under pressure in a shaped mold, or passing moist granules through an extruder or compression rolling machine. When the composition is to be molded in a hot press, the continuous phase should be in fibrous form or in granules having extremely good flow.

The discrete phase should be in granules, but may also consist of chopped pieces of impregnated yarn or fabric. Granulation should be performed before mixing with the continuous phase. The flow of the continuous phase should be good and the flow of the discrete phase should be poor under the actual conditions of processing, so that in the final product the continuous phase has flowed around the granules of the discrete phase which are thus randomly distributed throughout the continuous phase.

Granules of the discrete phase which are not fully cured are preferable so that they may undergo some compaction resulting in limited change of size and shape, giving better life and physical properties to the friction element. The discrete phase may also be heat treated before or after granulation in order to reduce its flow to enable it to retain its granular form during subsequent processing.

The discrete phase may be either chemically compatible or incompatible with the continuous phase but it is a particular object of the invention that chemically incompatible binders should be combined into the friction element since this cannot satisfactorily be performed by combining them in a homogeneous phase by simple blending. For example, phenolic resin is not compatible with polybutadiene rubber and a satisfactory mixed binder of these materials is not possible, however they may be used in a separate phase friction element of this invention.

The granules of the discrete phase may, if necessary, receive surface treatment, for example, by solvent, adhesives or adhesion promoter, to improve their adhesion to the material of the continuous phase. Such methods are well known in the prior art.

There is no minimum size of granules in the discrete phase but a visually mottled effect should be produced. The bulk of the granules should be retained on a 12 mesh screen, preferably on an 8 mesh screen. The maximum size of the granules in the discrete phase should not exceed 75% of the smallest dimension, usually the thickness normal to the working surface, of the friction element. Granules generally will be up to $\frac{1}{4}$ to $\frac{3}{8}$ of an inch in size.

Compositions of this invention result when the discrete phase comprises about 20% to 85%, preferably 55% to 85% of the total by weight.

Depending on the properties desired in the finished product, friction materials may be used as either the continuous phase or the discrete phase, since the materials used in each phase are each friction materials in their own right. The continuous phase must be suitable for fabrication by the method chosen, and this method need not be suitable for the fabrication of the discrete phase since the discrete phase is always embedded within the continuous phase. Where one phase is deficient in physical strength, a stronger composite can be formed when the continuous phase is the stronger material. If one phase is a thermal conductor, the composite will be a thermal insulator if the continuous phase is a good insulating material even though the discrete phase is a thermal conductor. With friction properties, the characteristics of the discrete phase generally predominate.

The friction materials of the two phases must be dissimilar, and maximum functional advantage is greatest for very dissimilar materials. Manufacture of the granules of the discrete phase and the blending of the two phases are accomplished by any method known in the art. Final shaping of the friction element generally takes place by a method consistent with the nature of the continuous phase. Composites of the invention have functional properties superior to those of at least one of the component phases used alone, and superior to those of a homogeneous mixture of the components, and the functional advantage obtained lasts throughout the lifetime of the friction element.

The invention is further described by the following non-limiting examples.

EXAMPLE 1

Both phases contain asbestos. Material A1, a rigid molded friction material, is made from a dry mix composed of 45 parts of asbestos fiber, 16 parts of powdered phenolic resin, and modifiers to bring the total to 100 parts. The dry mix is shaped under pressure in a mold heated to 160° C. for 10 minutes to produce disc brake pads. The material is tested for coefficient of friction by the method given in specification J661A of the S.A.E. Handbook (F.A.S.T. test) and is found to have a cold coefficient of friction of 0.37 and a hot coefficient of friction of 0.49. A sharp rise in friction is experienced when cooling during the second recovery period. This could lead to noisy and harsh braking after being used at high temperatures.

Friction material B1, of the "rigid rolled" type is made by a known method from 18 parts of cashew polymer in the fluid form, 52 parts of asbestos fiber, and 30 parts modifiers and hexa to cure the cashew polymer. A small amount of volatile solvent is added and evaporated during processing. Mixing is performed in a "Littleford" mixer to give moist rubbery granules. The granules are fed into the hopper of a compression rolling machine and compressed to form a moist compacted strip. The strip is cut into lengths and bent to form roughly radiused segments which are dried at 102° C. for two hours and then cured in radiused formers for 6 hours at 185° C. to form radiused drum brake lining segments. These are tested for friction in the same way as material A1 and found to have a cold coefficient of 0.44 and a hot coefficient of 0.32. Definite fade was observed during both the first and second recovery periods, and a coefficient of 0.22 was observed at a drum temperature of 150° C. during the second recovery.

A novel composite C1 prepared by compression molding to form rigid molded brake pads after blending 40 parts of discrete granules of material B1, which had been precured in an oven for 2 hours at 105° C. and cooled in a simple tumbler, with 60 parts of the uncured dry mix of material A1 (continuous phase). Disc brake pads were formed in the same way as for material A1. When these were tested a cold coefficient of 0.42 and a hot coefficient of 0.41 were obtained with remarkably good uniformity of friction throughout the whole test. Strong uniform braking was obtained under all conditions with freedom from noise and harsh braking and also freedom from tendency to fade. As a comparison, when the granules of material B1 were precured, disintegrated to a fibrous form, mixed in the same proportions with A1 to form one homogeneous mixture and molded, the pads formed were still subject to fading, and additionally required much longer curing time in the press.

EXAMPLE 2

A friction material B2, containing no asbestos, of the semi-metallic type was made from 30 parts steel fiber, 25 parts iron powder, 12 parts phenolic resin, 33 parts modifiers. It was dry mixed and cured as for material B1, and the disc pads obtained were tested for friction coefficient. Using friction material B2, a cold coefficient of 0.37 and a hot coefficient of 0.35 were obtained. The F.A.S.T. test was performed and a thickness loss of 0.25 mm was observed. Pads made from material A1 had a thickness loss of 0.63 mm. Semi-metallic material B2 is heat resistant and has long life, but it conducts heat, while asbestos based pads, such as those made from material A1, are heat insulators.

A novel composition of matter C2 was made as follows. The components of B2 were mixed in a "Littleford" mixer to a fibrous form, cured under pressure in a mold at 135° C. for 2 minutes, removed and cooled in water, dried and granulated in a hammermill in conventional manner. These granules are in the precured form and undergo further deformation and cure in a hot press. The composite C2 was mixed and molded as for composite C1, the continuous phase comprising 20 parts of A1 and the discrete phase comprising 80 parts of B2. The brake pads formed were tested and had a cold friction coefficient of 0.38 and a hot friction coefficent of 0.39. The loss of thickness on the F.A.S.T. test was 0.24 mm. The brake pads had sufficient thermal insulating power to be used effectively on older vehicles, while retaining the superior uniform coefficient of friction and long life of the semi-metallic component. The noise and harshness produced by A1 alone were eliminated, and the asbestos content reduced from 45% to 9%.

EXAMPLE 3

Both phases are non-asbestos friction material. Friction material A3 of the rigid molded type is made from 6 parts Kevlar fibers, 12 parts chopped glass fibers, 7 parts Xylok 225 resin, 8 parts powdered epoxy modified phenolic resin, and 67 parts powdered fillers and modifiers. Material A3 is mixed and molded in the same way as for material A1 in Example 1, and the resulting disc brake pads were tested. A cold friction coefficient of 0.44 and a hot friction coefficient of 0.45 were obtained. The wear on the F.A.S.T. test was 0.20 mm. A3 has excellent properties and is a good thermal insulator, but is very expensive to produce.

A novel composite C3 was made by blending $33\frac{1}{3}$ parts of the dry mixed components of material A3 as the continuous phase with $66\frac{2}{3}$ parts of the granules of semi-metallic friction material B2 as the discrete phase. The disc pads so formed had a cold friction coefficient of 0.43 and a hot friction coefficient of 0.42. The wear on the F.A.S.T. test was 0.21 mm. The advantageous friction, long-life and thermal insulation properties are retained while the cost is reduced. Composite C3 retains the advantages of its nonasbestos and its semi-metallic components.

Although the invention has been described in considerable detail with reference to certain preferred embodiments thereof, it will be understood that variations and modifications can be effected within the spirit and scope of the invention as described above and as defined in the appended claims.

What is claimed is:

1. A heterogeneous friction element comprising a continuous phase and at least one discrete granular phase embedded randomly throughout said continuous phase, wherein each phase consists of dissimilar thermosetting reinforced plastic friction material, each friction material comprising 10–80% reinforcing filler, 20–40% thermosetting binder and 0–70% modifiers, and wherein the discrete phase comprises particles retained on an 8 mesh screen and further comprises 55–85% of the total by weight, and wherein said friction element exhibits a higher cold coefficient of friction than the continuous phase, a higher hot coefficient of friction than the discrete phase, and a higher resistance to wear then the continuous phase.

2. A heterogeneous friction element of claim 1 wherein the discrete phase comprises 65–85% of the total by weight.

3. A heterogeneous friction element of claim 1 wherein the continuous phase comprises asbestos containing friction material and the discrete phase comprises semi-metallic non-asbestos containing friction material, the discrete phase comprising at least 65% of the total weight of the friction element, and wherein the friction element is thermally insulating.

4. A heterogeneous friction element of claim 1 wherein the continuous phase comprises non-asbestos containing friction material and the discrete phase comprises semi-metallic non-asbestos containing friction material, the discrete phase comprising at least 65% of the total weight of the friction element, and wherein the friction element is thermally insulating.

5. A heterogeneous friction element of claim 1 wherein the friction materials are a phenolic resin friction material and a polybutadiene rubber friction material.

6. A heterogeneous friction element of claim 1 wherein the discrete granular phase contains granules of at least two dissimilar thermosetting reinforced plastic friction materials.

* * * * *